No. 778,658. PATENTED DEC. 27, 1904.
F. O. GRIPP.
MANUFACTURE OF LINOLEUM.
APPLICATION FILED SEPT. 12, 1903.

Witnesses:
G. V. Forbes.
J. R. Fitton.

Inventor:
Friedrich Otto Gripp.
By
D. P. Wolhaupter
Attorney.

No. 778,658. Patented December 27, 1904.

UNITED STATES PATENT OFFICE.

FRIEDRICH OTTO GRIPP, OF BREMEN, GERMANY, ASSIGNOR TO THE FIRM OF BREMER LINOLEUMWERKE - DELMENHORST, OF DELMENHORST, OLDENBURG, GERMANY.

MANUFACTURE OF LINOLEUM.

SPECIFICATION forming part of Letters Patent No. 778,658, dated December 27, 1904.

Application filed September 12, 1903. Serial No. 172,980.

*To all whom it may concern:*

Be it known that I, FRIEDRICH OTTO GRIPP, a subject of the King of Prussia, Emperor of Germany, and a resident of Bremen, German Empire, have invented certain new and useful Improvements in the Manufacture of Linoleum of Multiple Layers and Apparatus Therefor, of which the following is a full, clear, and exact description.

In the process for making two or more layer linoleum or the like which forms the object of the present invention, and in the method of carrying out the same for which an apparatus (already employed for other like processes, and consisting of a pair of pressure-rollers and one or more divisions or partitions extending to the mouth of the rollers) is employed, the various previously-prepared coating substances for the separate layers, which substances are kept apart by the partitions up to the mouth of the rollers, are all conveyed in a loose condition up to the mouth of the rollers—that is to say, none of them are submitted to a previous pressure, and it is only in the mouth of the rollers that the separate masses are themselves compressed and formed into a coherent floor-covering of a formation corresponding to the various coating substances employed. This method of making so-called "compound" linoleum in several layers is simpler than if one layer is first rolled and then the substance for the next layer rolled thereon and, as experiments have shown, wears as well.

In the accompanying drawings the method of making two-layer linoleum or the like according to this process is shown.

Figure 1:
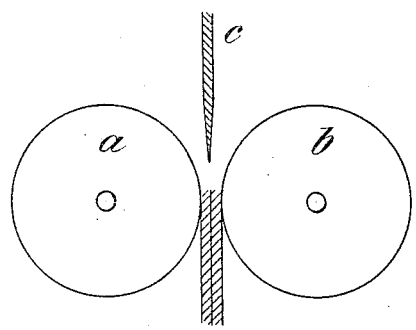

In Figure 1, $a$ and $b$ are two pressure-rollers arranged side by side, and $c$ is a partition extending from above up to the mouth of the rollers. The coating material for one layer of the linoleum lies on one side of this partition and the coating material for the other layer lies on the other side, and is thus conveyed to the rollers, both substances being in a loose condition. The partition $c$ keeps the two substances apart in the ordinary manner up to directly in front of the roller-mouth, and in the latter they are then once pressed and combined with one another.

Figure 2:
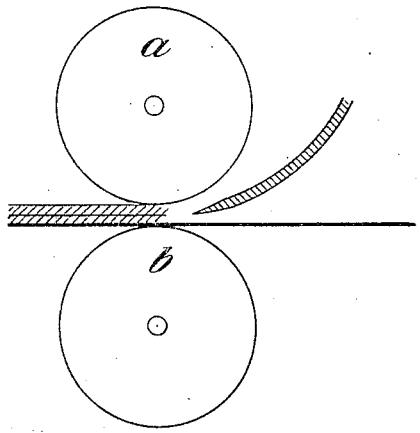

Fig. 2 shows the arrangement with superimposed pressure-rollers $a$ and $b$, the partition $c$ being, if required, able to be curved. The coating substance conveyed under the same is separated by means of a support fabric or web $d$, passed with it through the rollers or by means of a table extending to the roller-mouth.

The partition $c$ may be adjustably arranged in order to allow of the layers of substance to be regulated. If more than two different coating substances are to be combined to form the compound linoleum, more partitions for keeping apart the different substances must be provided. In order to insure a uniform introduction of the substances to the mouth of the rollers and to prevent the accumulation of the same in front of the latter, so-called "equalizing-rakes" may be employed which move the substances to and fro in front of the mouth of the rollers, and thereby distribute the same uniformly over the entire width of the rollers.

Having now described my invention, what I claim as new, and desire to secure by Letters Patent, is—

A process for making a multiple-layered linoleum product which consists in carrying different coating materials, for the separate layers, in a loose condition and in separate streams, into the mouth of a pair of pressure-rollers, mingling the separate loose streams at the point of compression in the mouth of the rollers and causing the same to pass between and from the latter in the form of a united sheet presenting different compressed layers upon opposite sides.

In witness whereof I have hereunto set my hand in presence of two witnesses.

FRIEDRICH OTTO GRIPP.

Witnesses:
  FR. HOYERMANN,
  C. DIEDERICH.